United States Patent

Shibayama

[11] Patent Number: 5,530,594
[45] Date of Patent: Jun. 25, 1996

[54] ZOOM LENS

[75] Inventor: Atsushi Shibayama, Kawasaki, Japan

[73] Assignee: Nikon Corporation, Tokyo, Japan

[21] Appl. No.: 288,806

[22] Filed: Aug. 12, 1994

[30] Foreign Application Priority Data

Aug. 31, 1993 [JP] Japan ........................... 5-215703
Aug. 31, 1993 [JP] Japan ........................... 5-215704

[51] Int. Cl.$^6$ ................................. G02B 15/14
[52] U.S. Cl. ........................... 359/690; 359/686
[58] Field of Search ................... 359/689, 690, 359/686

[56] References Cited

U.S. PATENT DOCUMENTS 4,840,469  6/1989  Moriyama ................... 359/690

FOREIGN PATENT DOCUMENTS 63-118116  5/1988  Japan.

Primary Examiner—Scott J. Sugarman
Attorney, Agent, or Firm—Shapiro and Shapiro

[57] ABSTRACT

A telephoto zoom lens includes, in the following order from the object side, a first lens group having a positive refracting power, a second lens group having a negative refracting power, and a third lens group having a positive refracting power. Upon zooming from the wide-angle end to the telephoto end, at least the first and third lens groups move in the object direction, the air distance between the first and second groups increases, and the air distance between the second and third lens groups decreases. The telephoto zoom lens satisfies the following conditions:

$$1.25 \leq f1/fW \leq 1.50$$

$$-0.37 \leq f2/fW \leq -0.30$$

$$0.37 \leq f3/fW \leq 0.46$$

where f1 is the focal length of the first lens group, f2 is the focal length of the second lens group, f3 is the focal length of the third lens group, and fW is the focal length of the entire system at the wide-angle end.

6 Claims, 2 Drawing Sheets

ZOOM LENS

BACKGROUND OF THE INVENTION

1. Field of the Invention

One aspect of the present invention relates to a telephoto zoom lens suited for a single-lens reflex camera and, more particularly, to a compact telephoto zoom lens which has a focal length at the wide-angle end, which is about 1.4 to 2 times of the diagonal length of an effective frame, and has a zoom ratio exceeding ×2.5. Another aspect of the present invention relates to a compact inner-focus type zoom lens which is suited for an auto-focus type single-lens reflex camera and has a zoom ratio exceeding ×2.5.

2. Related Background Art

As conventional telephoto zoom lenses having a zoom ratio exceeding ×2.5, (1) a four-group afocal zoom lens comprising positive, negative, positive, and positive lens groups, (2) a double telephoto type four-group zoom lens comprising positive, negative, positive, and negative lens groups, (3) a three-group zoom lens comprising positive, negative, and positive lens groups, and the like have been proposed. The four-group afocal zoom lens is suitable for a high-performance lens since the functions of the four lens groups are clearly distinguished from each other. The double telephoto type zoom lens is suitable for achieving a short total length since an enlargement magnification is provided by adopting a negative lens group as the fourth lens group. The three-group zoom lens is suitable for achieving a compact and low-cost structure since the number of lens groups is small.

However, the four-group afocal zoom lens has a fixed total length from the wide-angle end to the telephoto end, and it is difficult to shorten the total length. For this reason, the four-group afocal zoom lens tends to be large in size and heavy, and is not advantageous in portability. On the other hand, in the double telephoto type zoom lens, the total length at the wide-angle end can be smaller than that at the telephoto end, and portability can be improved. However, since the double telephoto type zoom lens requires four lens groups, the lens barrel structure is complicated, and cost cannot be sufficiently reduced. The three-group zoom lens (3) comprising positive, negative, and positive lens groups is suitable for achieving a low-cost structure, and can shorten the total length at the wide-angle end since the number of lens groups is as small as three. Also, this zoom lens is advantageous in portability. Such a zoom lens is proposed by, e.g., Japanese Patent Application Laid-Open No. 63-118116.

As a conventional focusing method of a zoom lens, a one-group extension method for moving the first lens group is known. This one-group extension method has a merit that moving amounts upon focusing to a given distance are equal to each other at the wide-angle end and the telephoto end, and is conventionally widely used as a focusing method of a zoom lens.

However, with the one-group extension focusing method, when an object at a near distance is to be focused, since the first lens group largely moves in the object direction, the vignetting in such a near distance phototaking state tends to be large, and in order to obtain a small vignetting even in the near distance phototaking state, the size of the first lens group must be increased. For this reason, this results in an increase in lens diameter and an increase in size of the entire zoom lens. Furthermore, when a zoom lens adopting this focusing method is attached to an auto-focus type camera and an auto-focus operation is to be performed, the first lens group as a large, heavy lens group must be moved, and it is difficult to achieve high-speed focusing.

SUMMARY OF THE INVENTION

It is an object of the present invention to achieve, in its first aspect, a more compact three-group zoom type telephoto zoom lens comprising positive, negative, and positive lens groups, which lens is advantageous in term of achieving a compact structure and low cost, than the prior art.

A telephoto zoom lens according to the first aspect of the present invention comprises, in the following order from the object side, a first lens group having a positive refracting power, a second lens group having a negative refracting power, and a third lens group having a positive refracting power, wherein upon zooming from the wide-angle end to the telephoto end, at least the first and third lens groups move in the object direction, an air distance between the first and second lens groups increases, and an air distance between the second and third lens groups decreases. The telephoto zoom lens satisfies the following conditions:

$$1.25 \leq f1/fW \leq 1.50 \tag{1}$$

$$-0.37 \leq f2/fW \leq -0.30 \tag{2}$$

$$0.37 \leq f3/fW \leq 0.46 \tag{3}$$

where f1 is the focal length of the first lens group, f2 is the focal length of the second lens group, f3 is the focal length of the third lens group, and fW is the focal length of the entire system at the wide-angle end.

The third lens group comprises, in the following order from the object side, a first lens subgroup having a positive refracting power and a second lens subgroup having a negative refracting power, and preferably satisfies the following conditions:

$$-5 \leq f3b/f3 \leq -3 \tag{4}$$

$$0.3 \leq D/fW \leq 0.6 \tag{5}$$

where f3b is the focal length of the second lens subgroup, and D is the air distance between the first and second lens subgroups.

Furthermore, the first lens subgroup comprises, in the following order from the object side, two double-convex positive lens components, and a meniscus-shaped lens component having a concave surface facing the image side, and the second lens subgroup comprises, in the following order from the object side, a negative meniscus lens having a concave surface facing the object side, and a positive lens having a convex surface facing the image side. If the imaging magnification of the second lens subgroup at the wide-angle end is represented by β3b, it preferably satisfies:

$$1.2 = \beta3b \leq 1.7 \tag{6}$$

The present invention adopts a simple structure comprising positive, negative, and positive lens groups, and the total length at the wide-angle end is decreased by moving the first lens group to the object side upon zooming from the wide-angle end to the telephoto end. Since the third lens group is moved upon zooming from the wide-angle end to the telephoto end, the third lens group also shares a zoom function, and hence, a change in imaging magnification of the second lens group can be small as compared to the zoom ratio, thus reducing variations of various aberrations upon zooming.

The respective condition formulas of the present invention will be explained below.

Condition formula (1) is associated with achieving a decrease in total length of the zoom lens, and defines a proper range of the focal length f1 of the first lens group. When the focal length f1 exceeds the upper limit of condition formula (1), the focal length of the first lens group is-prolonged, and hence, the total length of the zoom lens undesirably increases contrary to the object of the present invention. On the contrary, when the focal length f1 becomes smaller than the lower limit of condition formula (1), the focal length of the first lens group is shortened, and the back focus of the first lens group alone decreases accordingly. As a result, a possible maximum distance range between the first and second lens groups is narrowed, and it becomes difficult to obtain a high zoom ratio. Furthermore, it becomes difficult to correct various aberrations such as a spherical aberration, an astigmatism, and the like with good balance.

Condition formula (2) is associated with attaining a high zoom ratio of the zoom lens, and defines a proper range of the focal length f2 of the second lens group. When the focal length f2 becomes smaller than the lower limit of condition formula (2), the focal length of the second lens group increases in the negative direction, and it becomes difficult to obtain a high zoom ratio under condition formula (1). On the contrary, when the focal length exceeds the upper limit of condition formula (2), the focal length of the second lens group decreases in the negative direction, and it becomes difficult to suppress variations of various aberrations such as a spherical aberration, an astigmatism, a distortion, and the like upon zooming.

Condition formula (3) is associated with obtaining a decrease in total length of the zoom lens, and defines a proper range of the focal length f3 of the third lens group. When the focal length f3 exceeds the upper limit of condition formula (3), the focal length of the third lens group is prolonged, and the distance between two conjugate points associated with the third lens group (an object point for the third lens group, i.e., an image point defined by the first and second lens groups, and an image point for the third lens group, i.e., an image point of the entire zoom lens system) increases, resulting an increase in total length of the zoom lens. Contrary to this, when the focal length f3 becomes smaller than the lower limit of condition formula (3), the focal length of the third lens group is shortened, and it becomes difficult to correct various aberrations such as a spherical aberration, and the like with good balance. Also, the back focus at the wide-angle end is shortened, and the zoom lens is not suitable for a single-lens reflex camera.

In the present invention, as described above, in order to further decrease the total length, it is desirable that the third lens group G3 comprise, in the following order from the object side, a first lens subgroup G3a having a positive refracting power and a second lens subgroup G3b having a negative refracting power. With this arrangement, the third lens group can have a telephoto type structure, and the total length of the zoom lens can be shortened. In addition, since the negative second lens subgroup generates a positive distortion, a negative distortion which is likely to be generated by the negative second lens group can be canceled. At this time, it is desirable to satisfy condition formulas (4) and (5).

When the focal length of the second lens subgroup becomes smaller than the lower limit of condition formula (4), the focal length of the second lens subgroup increases in the negative direction, and the effect obtained upon employment of a telephoto type third lens group becomes weak, resulting in an increase in total length. Contrary to this, when the focal length of the second lens subgroup exceeds the upper limit of condition formula (4), the focal length of the second lens subgroup decreases in the negative direction, and it becomes difficult to satisfactorily correct various aberrations such as a spherical aberration, and the like. Furthermore, the back focus at the wide-angle end is shortened, and the zoom lens is not suitable for a single-lens reflex camera.

Condition formula (5) defines an optimal range of the air distance between the first and second lens subgroups under condition formula (4). When the air distance exceeds the upper limit of condition formula (5), the total length of the third lens group increases, and it becomes difficult to decrease the total length of the zoom lens. Contrary to this, when the air distance becomes smaller than the lower limit of condition formula (5), it becomes difficult to correct a negative distortion which tends to be generated by the second lens group.

Furthermore, in order to satisfactorily correct various aberrations, it is desirable that the first lens subgroup G3a comprise, in the following order from the object side, two double-convex positive lens components, and a meniscus-shaped lens component having a concave surface facing the image side, and the second lens subgroup G3b comprise, in the following order from the object side, a negative meniscus lens having a concave surface facing the object side, and a positive lens having a convex surface facing the image side.

In order to reliably decrease the total length under condition formulas (4) and (5), it is desirable to satisfy condition formula (6).

When the imaging magnification of the second lens subgroup becomes smaller than the lower limit of condition formula (6), the effect obtained upon employment of a telephoto type third lens group becomes weak, resulting in an increase in total length. On the contrary, when the imaging magnification exceeds the upper limit of condition formula (6), the effect obtained upon employment of a telephoto type third lens group becomes excessive, and it becomes difficult to correct various aberrations such as a spherical aberration, and the like.

In the first lens subgroup, in order to correct various aberrations such as a spherical aberration, an on-axis chromatic aberration, and the like with good balance, it is desirable that the first lens subgroup comprise, in the following order from the object side, a double-convex positive lens, a cemented positive lens constituted by a double-convex positive lens L32 and a negative meniscus lens L33, and a cemented positive lens constituted by a double-convex positive lens L34 and a double-concave negative lens L35, and it is also desirable that a stop be arranged immediately after the first lens subgroup.

At this time, in order to satisfactorily correct a spherical aberration and to obtain a proper Petzval's sum, it is desirable to satisfy the following condition formulas:

$$n33 - n32 \geq 0.2 \tag{7}$$

$$n35 - n34 \geq 0.2 \tag{8}$$

where n32 is the refractive index of the double-convex positive lens, n33 is the refractive index of the negative meniscus lens L33, n34 is the refractive index of the double-convex positive lens L34, and n35 is the refractive index of the double-concave negative lens L35.

In order to achieve both the compact zoom lens and correction of various aberrations, it is desirable that a stop be arranged to be movable together with the third lens group.

In order to satisfactorily correct an on-axis chromatic aberration, it is desirable to satisfy the following condition formulas:

$$v32-v33 \geq 10 \quad (9)$$

$$v34-v35 \geq 25 \quad (10)$$

where v32 is the Abbe's number of the double-convex positive lens L32, v33 is the Abbe's number of the negative meniscus lens L33, v34 is the Abbe's number of the double-convex positive lens L34, and v35 is the Abbe's number of the double-concave negative lens L35.

It is an object of the present invention to achieve, in its second aspect, a compact lens system, and satisfactory correction of various aberrations upon zooming and focusing when a three-group zoom lens comprising positive, negative, and positive lens groups adopts an inner-focus type for moving the second lens group, which is advantageous in auto-focus and a compact structure.

In the case of the three-group zoom lens comprising positive, negative, and positive lens groups like in the present invention, since a light beam is most converged in the second lens group, the second lens group has the smallest diameter and is lightweight. For this reason, focusing is performed using the second lens group. Such a focusing method is advantageous in high-speed focusing in an auto-focus operation as compared to focusing using the first lens group or the third lens group.

An inner-focus type zoom lens according to the second aspect of the present invention comprises, in the following order from the object side, a first lens group having a positive refracting power, a second lens group having a negative refracting power, and a third lens group having a positive refracting power, wherein, upon zooming from the wide-angle end to the telephoto end, at least the first and third lens groups move in the object direction, the air distance between the first and second lens groups increases, and the air distance between the second and third lens groups decreases, and, upon focusing from a far-distance object to a near-distance object, the second lens group moves in the object direction. The zoom lens satisfies the following conditions:

$$0.5 \leq |\beta 2T| 0.8, \text{ for } \beta 2T<0 \quad (11)$$

$$1.2 \leq \beta 3T/\beta 3W \leq 2.0 \quad (12)$$

where β2T is the imaging magnification of the second lens group at the telephoto end, β3W is the imaging magnification of the third lens group at the wide-angle end, and β3T is the imaging magnification of the third lens group at the telephoto end.

When the focal length of the first lens group is represented by f1, the focal length of the second lens group is represented by f2, and the focal length of the entire system when the zoom lens is at the wide-angle end is represented by fW, it is preferable to satisfy the following conditions:

$$1.1 \leq f1/fW \leq 1.7 \quad (13)$$

$$0.30 \leq |f2|/fW \leq 0.43; \text{ for } f2<0 \quad (14)$$

Also, the following condition is preferably satisfied:

$$2.0 \leq |\beta 3T| \leq 3.2; \text{ for } \beta 3T<0 \quad (15)$$

Furthermore, a stop according to the present invention is arranged to be movable together with the third lens group.

The present invention adopts a simple structure comprising positive, negative, and positive lens groups, and the total length at the wide-angle end is decreased by moving the first lens group to the object side upon zooming from the wide-angle end to the telephoto end. Since focusing is performed by moving the compact, lightweight second lens group, a compact lens system and a high focusing speed in an auto-focus operation can be realized.

Since the third lens group is moved upon zooming from the wide-angle end to the telephoto end, the third lens group also shares a zoom function, and hence, a change in imaging magnification of the second lens group can be small as compared to the zoom ratio, thus eliminating variations of various aberrations upon zooming and focusing. The respective condition formulas will be explained below.

Condition formula (11) defines a proper range of the imaging magnification β2T of the second lens group at the telephoto end when focusing is performed using the second lens group. When the imaging magnification exceeds the upper limit of condition formula (11), the moving amount upon focusing of the second lens group at the telephoto end increases, and it becomes difficult to sufficiently decrease the shortest phototaking distance. When the imaging magnification β2 of the second lens group is an equal magnification (β2 =−1), focusing is disabled. On the contrary, when the imaging magnification becomes smaller than the lower limit of condition formula (11), the divergent function of the second lens group at the telephoto end becomes excessive, and the total length of the zoom lens undesirably increases.

In the zoom lens according to the second aspect of the present invention, the zooming function is shared not only by the second lens group but also by the third lens group. For this reason, a change in imaging magnification of the second lens group can become small as compared to the zoom ratio, and variations of various aberrations generated in the second lens group upon zooming and focusing can be suppressed. Condition formula (12) defines a proper range for the change ratio in imaging magnification of the third lens group at that time.

When the change ratio becomes smaller than the lower limit of condition formula (12), the zooming function shared by the third lens group becomes small, and a change in imaging magnification of the second lens group increases. For this reason, variations of various aberrations upon zooming and focusing, in particular, variations of a curvature of field and an astigmatism become undesirably large. On the contrary, when the change ratio exceeds the upper limit of condition formula (12), a change in imaging magnification of the third lens group becomes excessive, and variations of various aberrations in the third lens group occur. As a result, it becomes difficult to correct aberrations. Furthermore, when the stop is arranged together with the third lens group, full-open f-numbers at the wide-angle end and the telephoto end become largely different from each other, and the full-open f-number at the telephoto end tends to be large.

Furthermore, in a three-group inner-focus type zoom lens comprising positive, negative, and positive lens groups, when the focal length at the wide-angle end is set to be about 1.3 to 3 times of the diagonal length of an effective frame, and a zoom ratio exceeding ×2.5 is to be obtained, it is desirable to satisfy conditions given by condition formulas (13) and (14).

Condition formula (13) is associated with a decrease in total length of the zoom lens, and defines a proper range of the focal length f1 of the first lens group. When the focal length f1 exceeds the upper limit of condition formula (13), the focal length of the first lens group is prolonged, and hence, the total length of the zoom lens undesirably increases. On the contrary, when the focal length f1 becomes smaller than the lower limit of condition formula (13), the focal length of the first lens group is shortened, and the back focus of the first lens group alone decreases accordingly. As a result, a possible maximum distance range between the first and second lens groups is narrowed, and it becomes difficult to obtain a high zoom ratio. Furthermore, it becomes difficult to correct various aberrations such as a spherical aberration, an astigmatism, and the like with good balance.

Condition formula (14) is associated with a high zoom ratio of the zoom lens, and defines a proper range of the focal length f2 of the second lens group. When the focal length f2 exceeds the upper limit of condition formula (14), the focal length of the second lens group increases in the negative direction, and it becomes difficult to obtain a high zoom ratio under condition formula (13). On the contrary, when the focal length f2 becomes smaller than the lower limit of condition formula (14), the focal length of the second lens group decreases in the negative direction, and it becomes difficult to suppress variations of various aberrations such as a spherical aberration, an astigmatism, a distortion, and the like upon zooming and focusing.

Furthermore, in order to achieve a compact zoom lens, it is desirable to satisfy condition formula (15).

Condition formula (15) is associated with a decrease in total length of the zoom lens, and defines a proper range of the imaging magnification β3T of the third lens group at the telephoto end. When the imaging magnification becomes smaller than the lower limit of condition formula (15), the imaging magnification of the third lens group at the telephoto end decreases in the negative direction, and the telephoto function of the zoom lens as a whole becomes small, resulting in an increase in total length of the zoom lens. On the contrary, when the imaging magnification exceeds the upper limit of condition formula (15), the imaging magnification of the third lens group at the telephoto end increases in the negative direction, and various aberrations generated in the first and second lens groups are enlarged by the third lens group. As a result, it becomes difficult to correct various aberrations such as a spherical aberration and the like.

DETAILED DESCRIPTION OF THE PREFERRED EMBODIMENTS

The first and second embodiments according to the first aspect of the present invention will be described below.

[First Embodiment]

Figure 1:
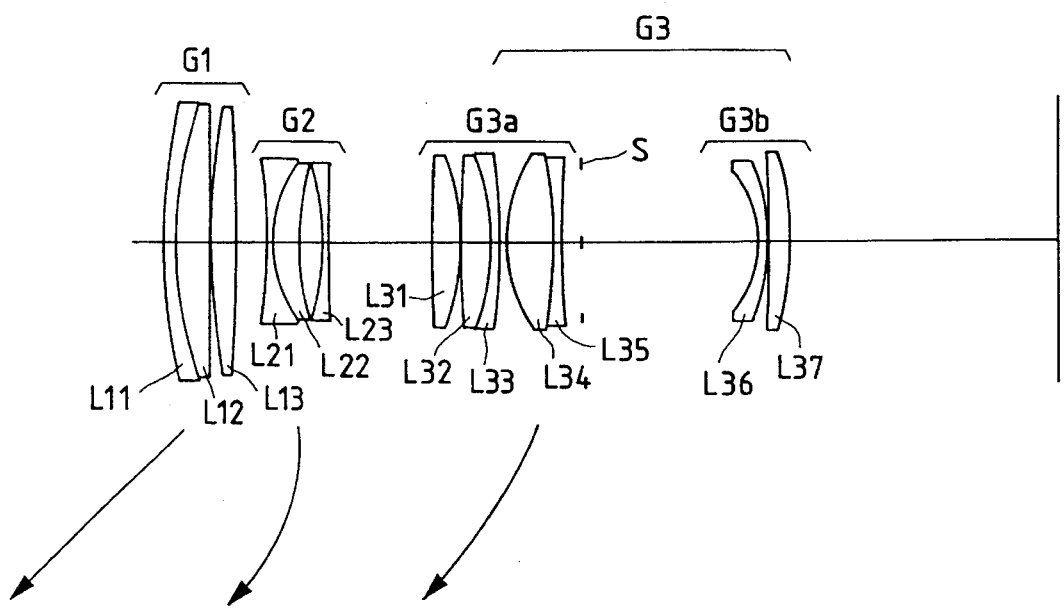
FIG. 1 is a lens diagram showing the first embodiment of a zoom lens according to the present invention.

FIG. 1 is a lens diagram showing the first embodiment. The zoom lens of the first embodiment comprises, in the following order from the object side: a first lens group G1 which has a positive refracting power and is constituted by a cemented positive lens consisting of a negative meniscus lens L11 and a double-convex lens L12, and a double-convex positive lens L13; a second lens group G2 which has a negative refracting power and is constituted by a cemented negative lens consisting of a double-concave negative lens L21 and a positive meniscus lens L22, and a double-concave negative lens L23 having a concave surface with a smaller radius of curvature facing the object side; and a third lens group G3 which has a positive refracting power and is constituted by a first lens subgroup G3a having a positive refracting power and constituted by a double-convex positive lens L31, a cemented positive lens which is a double-convex positive lens as a cemented lens unit and consists of a double-convex positive lens L32 and a negative meniscus lens L33, and a cemented positive lens which is a meniscus lens as a cemented lens unit and consists of a double-convex positive lens L34 and a double-concave negative lens L35, a stop S, and a second lens subgroup G3b having a negative refracting power and constituted by a negative meniscus lens L36 having a concave surface facing the object side and a positive meniscus lens L37 having a convex surface facing the image plane side.

Upon zooming from the wide-angle end to the telephoto end, the first and third lens groups G1 and G3 move together in the object direction, the second lens group G2 moves closer to the object at least at the telephoto end than at the wide angle end, the air distance between the first and second lens groups G1 and G2 increases, and the air distance between the second and third lens groups G2 and G3 decreases. FIG. 1 shows the lens positions at the wide-angle end, and arrows indicate the moving loci of the lens groups upon zooming from the wide-angle end to the telephoto end.

In the first embodiment, focusing from a far distance to a near distance is performed by moving the second lens group G2 in the object direction. Since the second lens group G2 is used for focusing, the lens diameter of the first lens group can be decreased, and the closest phototaking distance can be shortened.

Table 1 below summarizes data values according to the first embodiment of the present invention. In the data table of this embodiment, f is the focal length, F is the f-number, and 2ω is the field angle. In addition, numeral i in the leftmost column is the order of the lens surface from the object side, r is the radius of curvature of the lens surface, d is the lens surface interval, and n and ν are the values of the refractive index and the Abbe's number in correspondence with the d-line (λ=587.6 nm).

TABLE 1 f = 70.60 to 202.44
F = 4.09 to 5.68
2ω = 35.2 to 11.9°

| i | r | d | ν | n |
|---|---|---|---|---|
| 1 | 90.2192 | 1.875 | 23.0 | 1.86074 |
| 2 | 56.4067 | 5.625 | 64.1 | 1.51680 |
| 3 | −3207.9350 | .125 | | |
| 4 | 108.5369 | 4.000 | 56.4 | 1.50137 |
| 5 | −302.2972 | (d5) | | |
| 6 | −82.6007 | 1.375 | 58.5 | 1.65160 |
| 7 | 19.9831 | 3.750 | 23.0 | 1.86074 |
| 8 | 37.1254 | 3.625 | | |
| 9 | −42.4576 | 1.375 | 49.4 | 1.77279 |
| 10 | 3344.2110 | (d10) | | |
| 11 | 379.7595 | 4.000 | 59.0 | 1.51823 |
| 12 | −37.9647 | .125 | | |
| 13 | 153.5445 | 4.625 | 59.0 | 1.51823 |
| 14 | −36.1209 | 1.375 | 40.9 | 1.79631 |
| 15 | −105.0394 | .375 | | |
| 16 | 23.1575 | 7.250 | 64.1 | 1.51680 |
| 17 | −65.7760 | 1.375 | 25.5 | 1.80458 |

TABLE 1-continued f = 70.60 to 202.44
F = 4.09 to 5.68
2ω = 35.2 to 11.9°

| i | r | d | v | n |
|---|---|---|---|---|
| 18 | 168.9502 | 2.750 | | |
| 19 | ∞ | 28.918 | (stop) | |
| 20 | −15.1836 | 1.500 | 46.5 | 1.80411 |
| 21 | −28.2829 | .125 | | |
| 22 | −278.6342 | 3.375 | 25.8 | 1.78472 |
| 23 | −47.8903 | (B.f) | | |

(Variable Interval Upon Zooming)

| | | | |
|---|---|---|---|
| f | 70.5987 | 133.3121 | 202.4442 |
| d5 | 4.5707 | 28.4524 | 35.0774 |
| d10 | 16.1257 | 7.7669 | 1.6901 |
| B.f | 41.7660 | 51.9255 | 69.3959 |

(Condition Corresponding Value)

(1) f1/fW = 1.452
(2) f2/fW = −0.351
(3) f3/fW = 0.436
(4) f3b/f3 = −3.89
(5) D/fW = 0.449
(6) β3b = 1.441
(7) n33 − n32 = 0.27808
(8) n35 − n34 = 0.28778
(9) ν32 − ν33 = 18.1
(10) ν34 − ν35 = 38.6

[Second Embodiment]

Figure 2:
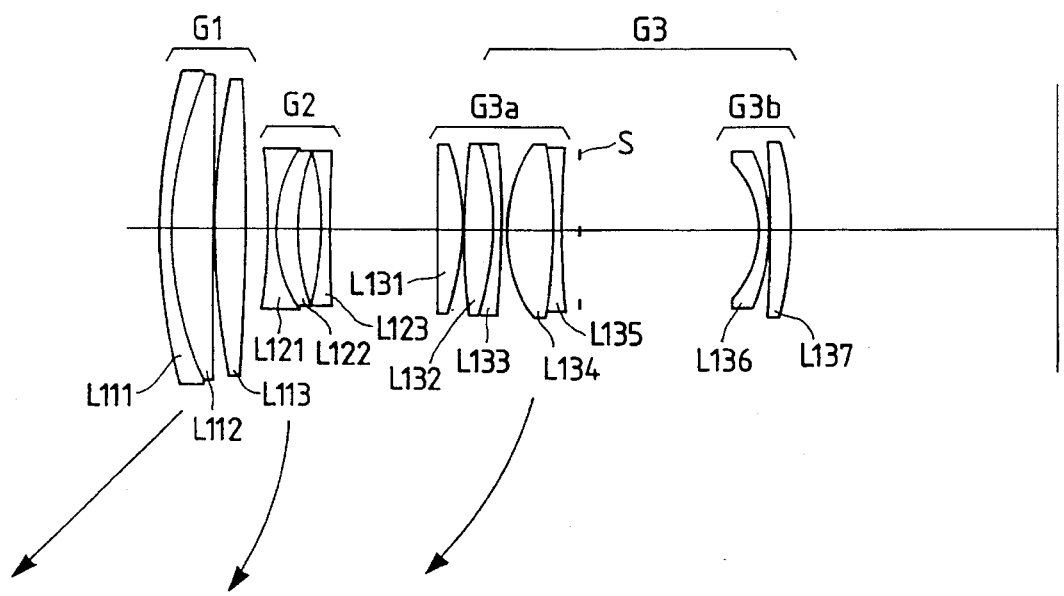
FIG. 2 is a lens diagram showing the second embodiment of a zoom lens according to the present invention.

FIG. 2 is a lens diagram showing the second embodiment. The zoom lens of this embodiment comprises, in the following order from the object side: a first lens group G1 which has a positive refracting power and is constituted by a cemented positive lens consisting of a negative meniscus lens L111 and a double-convex lens L112, and a double-convex positive lens L113; a second lens group G2 which has a negative refracting power and is constituted by a cemented negative lens consisting of a double-concave negative lens L121 and a positive meniscus lens L122, and a double-concave negative lens L123 having a concave surface with a smaller radius of curvature facing the object side; and a third lens group G3 which has a positive refracting power and is constituted by a first lens subgroup G3a having a positive refracting power and constituted by a double-convex positive lens L131, a cemented positive lens which consists of a double-convex positive lens L132 and a negative meniscus lens L133, and a cemented positive lens which consists of a double-convex positive lens L134 and a double-concave negative lens L135, a stop S, and a second lens subgroup G3b having a negative refracting power and constituted by a negative meniscus lens L136 having a concave surface facing the object side and a positive meniscus lens L137 having a convex surface facing the image plane side.

Upon zooming from the wide-angle end to the telephoto end, the first and third lens groups G1 and G3 move together in the object direction, the second lens group G2 moves closer to the object at least at the telephoto end than at the wide angle end, the air distance between the first and second lens groups G1 and G2 increases, and the air distance between the second and third lens groups G2 and G3 decreases. FIG. 2 shows the lens positions at the wide-angle end, and arrows indicate the moving loci of the lens groups upon zooming from the wide-angle end to the telephoto end.

In the second embodiment, focusing from a far distance to a near distance is performed by moving the first lens group G1 in the object direction.

Table 2 below summarizes data values according to the second embodiment of the present invention. In the data table of this embodiment, f is the focal length, F is the f-number, and 2ω is the field angle. In addition, numeral i in the leftmost column is the order of the lens surface from the object side, r is the radius of curvature of the lens surface, d is the lens surface interval, and n and ν are the values of the refractive index and the Abbe's number in correspondence with the d-line (λ=587.6 nm).

TABLE 2 f = 70.60 to 202.44
F = 4.10 to 5.74
2ω = 35.1 to 11.9°

| i | r | d | v | n |
|---|---|---|---|---|
| 1 | 83.7390 | 1.875 | 23.0 | 1.86074 |
| 2 | 53.8424 | 7.000 | 64.1 | 1.51680 |
| 3 | −3445.3237 | .125 | | |
| 4 | 120.0309 | 4.875 | 56.4 | 1.50137 |
| 5 | −296.2943 | (d5) | | |
| 6 | −82.9140 | 1.375 | 58.5 | 1.65160 |
| 7 | 20.0337 | 3.750 | 23.0 | 1.86074 |
| 8 | 37.4080 | 3.625 | | |
| 9 | −43.0096 | 1.375 | 49.4 | 1.77279 |
| 10 | 1223.8375 | (d10) | | |
| 11 | 503.8516 | 4.000 | 59.0 | 1.51823 |
| 12 | −36.7397 | 0.125 | | |
| 13 | 106.4352 | 4.625 | 59.0 | 1.51823 |
| 14 | −38.0556 | 1.375 | 40.9 | 1.79631 |
| 15 | −137.0427 | .375 | | |
| 16 | 23.1807 | 7.250 | 64.1 | 1.51680 |
| 17 | −69.6115 | 1.375 | 25.5 | 1.80458 |
| 18 | 149.8504 | 2.750 | | |
| 19 | ∞ | 28.921 | (stop) | |
| 20 | −15.1875 | 1.500 | 46.5 | 1.80411 |
| 21 | −28.1687 | .125 | | |
| 22 | −194.2505 | 3.375 | 25.8 | 1.78472 |
| 23 | −45.1040 | (B.f) | | |

(Variable Interval Upon Zooming)

| | | | |
|---|---|---|---|
| f | 70.5993 | 133.3080 | 202.4385 |
| d5 | 3.4404 | 26.9470 | 33.5720 |
| d10 | 16.4234 | 8.0716 | 2.0628 |
| B.f | 41.5074 | 52.2703 | 70.0546 |

(Condition Corresponding Value)

(1) f1/fW = 1.452
(2) f2/fW = −0.351
(3) f3/fW = 0.436
(4) f3b/f3 −3.89
(5) D/fW = 0.449
(6) β3b = 1.441
(7) n33 − n32 = 0.27808
(8) n35 − n34 = 0.28778
(9) ν32 − ν33 = 18.1
(10) ν34 − ν35 = 38.6

As described above, according to the first aspect of the present invention, a high-performance telephoto zoom lens, which has a compact structure and a high zoom ratio, and is suitable for a single-lens reflex camera, can be achieved.

Note that by decentering one of the first, second, and third lens groups of the telephoto zoom lens according to the first aspect of the present invention in a direction perpendicular to the optical axis, the vibration of the zoom lens as a whole can be canceled, and the image can be stabilized.

The third and fourth embodiments according to the second aspect of the present invention will be described below.

[Third Embodiment]

Figure 3:
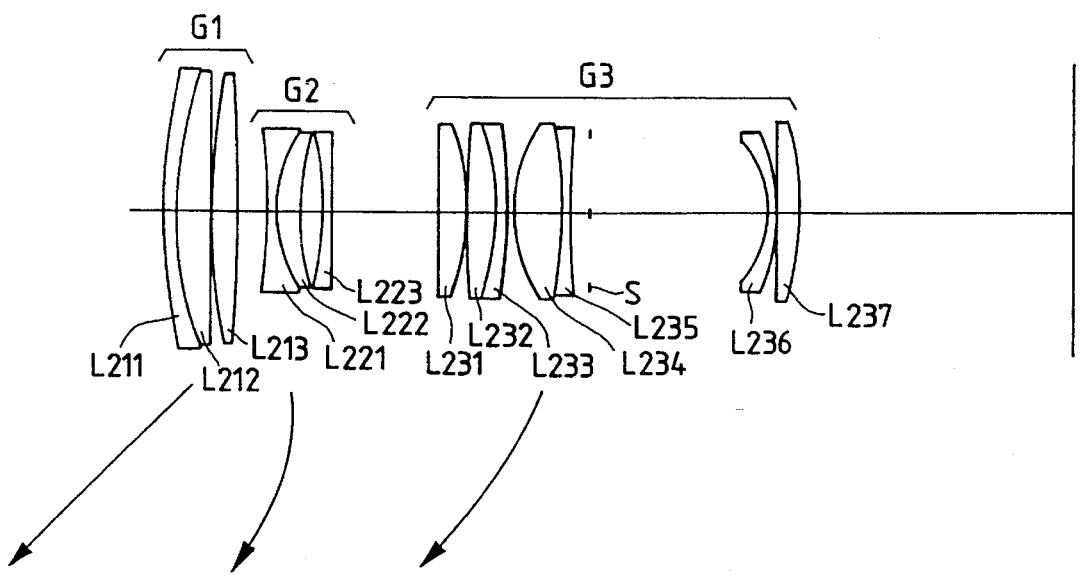
FIG. 3 is a lens diagram showing the third embodiment of a zoom lens according to the present invention.

FIG. 3 is a lens diagram showing the third embodiment. The zoom lens of this embodiment comprises, in the following order from the object side: a first lens group G1 which has a positive refracting power and is constituted by a cemented positive lens consisting of a negative meniscus lens L211 and a double-convex positive lens L212, and a double-convex positive lens L213; a second lens group G2 which has a negative refracting power and is constituted by a cemented negative lens consisting of a double-concave negative lens L221 and a positive meniscus lens L222, and a double-concave negative lens L223 having a concave surface with a smaller radius of curvature facing the object side; and a third lens group G3 which has a positive refracting power and is constituted by a double-convex positive lens L231, a cemented positive lens which consists of a double-convex positive lens L232 and a negative meniscus lens L233, a cemented positive lens which consists of a double-convex positive lens L234 and a double-concave negative lens L235, a stop S, a negative meniscus lens L236 having a concave surface facing the object side, and a positive meniscus lens L237 having a convex surface facing the image plane side. Upon zooming from the wide-angle end to the telephoto end, the first and third lens groups G1 and G3 move together in the object direction, the second lens group G2 moves closer to the object at least at the telephoto end than at the wide angle end, the air distance between the first and second lens groups G1 and G2 increases, and the air distance between the second and third lens groups G2 and G3 decreases. FIG. 3 shows the lens positions at the wide-angle end, and arrows indicate the moving loci of the lens groups upon zooming from the wide-angle end to the telephoto end. Focusing from a far distance to a near distance is performed by moving the second lens group G2 in the object direction.

Table 3 below summarizes data values according to the third embodiment of the present invention. In the data table of this embodiment, f is the focal length, F is the f-number, and 2ω is the field angle. In addition, numeral i in the leftmost column is the order of the lens surface from the object side, r is the radius of curvature of the lens surface, d is the lens surface interval, and n and v are the values of the refractive index and the Abbe's number in correspondence with the d-line (λ=587.6 nm).

TABLE 3 f = 70.60 to 202.44
F = 4.09 to 5.68
2ω = 35.2 to 11.9°

| i | r | d | v | n |
|---|---|---|---|---|
| 1 | 90.2192 | 1.875 | 23.0 | 1.86074 |
| 2 | 56.4067 | 5.625 | 64.1 | 1.51680 |
| 3 | −3207.9350 | .125 | | |
| 4 | 108.5369 | 4.000 | 56.4 | 1.50137 |
| 5 | −302.2972 | (d5) | | |
| 6 | −82.6007 | 1.375 | 58.5 | 1.65160 |
| 7 | 19.9831 | 3.750 | 23.0 | 1.86074 |
| 8 | 37.1254 | 3.625 | | |
| 9 | −42.4576 | 1.375 | 49.4 | 1.77279 |
| 10 | 3344.2110 | (d10) | | |
| 11 | 379.7595 | 4.000 | 59.0 | 1.51823 |
| 12 | −37.9647 | .125 | | |
| 13 | 153.5445 | 4.625 | 59.0 | 1.51823 |
| 14 | −36.1209 | 1.375 | 40.9 | 1.79631 |
| 15 | −105.0394 | .375 | | |
| 16 | 23.1575 | 7.250 | 64.1 | 1.51680 |
| 17 | −65.7760 | 1.375 | 25.5 | 1.80458 |
| 18 | 168.9502 | 2.750 | | |
| 19 | ∞ | 28.918 | (stop) | |
| 20 | −15.1836 | 1.500 | 46.5 | 1.80411 |
| 21 | −28.2829 | .125 | | |
| 22 | −278.6342 | 3.375 | 25.8 | 1.78472 |
| 23 | −47.8903 | (B.f) | | |

(Variable Interval Upon Zooming)

| f | 70.5987 | 133.3121 | 202.4442 |
|---|---|---|---|
| d5 | 4.5707 | 28.4524 | 35.0774 |
| d10 | 16.1257 | 7.7669 | 1.6901 |

TABLE 3-continued f = 70.60 to 202.44
F = 4.09 to 5.68
2ω = 35.2 to 11.9°

| i | r | d | v | n |
|---|---|---|---|---|
| B.f | 41.7660 | 51.9255 | | 69.3959 |

(Variable Interval When Imaging Magnification β = −0.025)

| f | 70.5987 | 133.3121 | 202.4442 |
|---|---|---|---|
| β | −.0250 | −.0250 | −.0250 |
| R | 2873.1962 | 5195.7597 | 7756.1834 |
| d5 | 3.9272 | 27.3067 | 33.6715 |
| d10 | 16.7692 | 8.9126 | 3.0960 |
| B.f | 41.7660 | 51.9255 | 69.3958 |

(Condition Corresponding Value)

(11) β2T = −0.736
(12) β3T/β3W = 1.503
(13) f1/fW = 1.452
(14) f2/fW = −0.351
(15) β3T = −2.683

[Fourth Embodiment]

Figure 4:
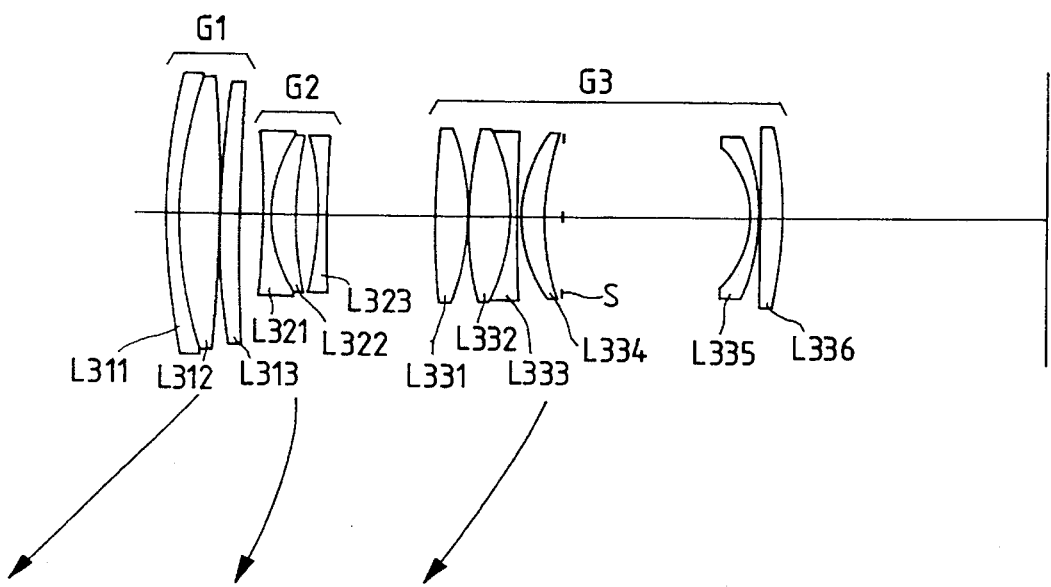
FIG. 4 is a lens diagram showing the fourth embodiment of a zoom lens according to the present invention.

FIG. 4 is a lens diagram of the fourth embodiment. The zoom lens of this embodiment comprises, in the following order from the object side: a first lens group G1 which has a positive refracting power and is constituted by a cemented positive lens consisting of a negative meniscus lens L311 and a double-convex positive lens L312, and a positive meniscus lens L313 having a convex surface facing the object side; a second lens group G2 which has a negative refracting power and is constituted by a cemented negative lens consisting of a double-concave negative lens L321 and a positive meniscus lens L322, and a double-concave negative lens having a concave surface with a smaller radius of curvature facing the object side; and a third lens group G3 which has a positive refracting power and is constituted by a double-convex positive lens L331, a cemented positive lens consisting of a double-convex positive lens L332 and a double-concave negative lens L333, a positive meniscus lens L334 having a convex surface facing the object side, a stop S, a negative meniscus lens L335 having a concave surface facing the object side, and a double-convex positive lens L336 having a convex surface with a higher radius of curvature facing the image plane side.

Upon zooming from the wide-angle end to the telephoto end, the first and third lens groups G1 and G3 move together in the object direction, the second lens group G2 moves closer to the object at least at the telephoto end than at the wide angle end, the air distance between the first and second lens groups G1 and G2 increases, and the air distance between the second and third lens groups G2 and G3 decreases. FIG. 4 shows the lens positions at the wide-angle end, and arrows indicate the moving loci of the lens groups upon zooming from the wide-angle end to the telephoto end. Focusing from a far distance to a near distance is performed by moving the second lens group G2 in the object direction.

Table 4 below summarizes data values according to the fourth embodiment of the present invention. In the data table of this embodiment, f is the focal length, F is the f-number, and 2ω is the field angle. In addition, numeral i in the leftmost column is the order of the lens surface from the object side, r is the radius of curvature of the lens surface, d is the lens surface interval, and n and v are the values of the refractive index and the Abbe's number in correspondence with the d-line (λ=587.6 nm).

TABLE 4 f = 70.60 to 202.43
F = 4.00 to 5.68
2ω = 35.1 to 11.9°

| i | r | d | ν | n |
|---|---|---|---|---|
| 1 | 88.1409 | 1.875 | 23.0 | 1.86074 |
| 2 | 57.3386 | 6.500 | 64.1 | 1.51680 |
| 3 | −240.0927 | .125 | | |
| 4 | 133.2533 | 3.125 | 54.6 | 1.51454 |
| 5 | 762.7255 | (d5) | | |
| 6 | −129.5266 | 1.375 | 58.5 | 1.65160 |
| 7 | 20.7128 | 3.500 | 23.0 | 1.86074 |
| 8 | 41.5763 | 3.875 | | |
| 9 | −44.7701 | 1.375 | 46.5 | 1.80411 |
| 10 | 247.9675 | (d10) | | |
| 11 | 109.4866 | 5.000 | 49.0 | 1.53172 |
| 12 | −36.4263 | .125 | | |
| 13 | 49.5668 | 6.375 | 64.1 | 1.51680 |
| 14 | −28.3293 | 1.375 | 27.6 | 1.75520 |
| 15 | 1240.2446 | .375 | | |
| 16 | 20.5191 | 3.500 | 64.1 | 1.51680 |
| 17 | 35.9424 | 2.750 | | |
| 18 | ∞ | 29.000 | (stop) | |
| 19 | −14.3107 | 1.500 | 46.8 | 1.76684 |
| 20 | −26.2535 | .125 | | |
| 21 | 1451.1245 | 3.375 | 25.5 | 1.80458 |
| 22 | −61.7409 | (B.f) | | |

(Variable Interval Upon Zooming)

| f | 70.6039 | 133.2734 | 202.4283 |
|---|---|---|---|
| d5 | 3.2658 | 29.7002 | 36.9403 |
| d10 | 16.1032 | 7.4697 | 1.1666 |
| B.f | 40.2607 | 49.8480 | 66.6864 |

(Variable Interval When Imaging Magnification β = −0.025)

| f | 70.6039 | 133.2734 | 202.4283 |
|---|---|---|---|
| β | −.0250 | −.0250 | −.0250 |
| R | 2868.5019 | 5190.2746 | 7764.9349 |
| d5 | 2.5739 | 28.4908 | 35.5026 |
| d10 | 16.7952 | 8.6791 | 2.6043 |
| B.f | 40.2607 | 49.8480 | 66.6864 |

(Condition Corresponding Value)

(11) $\beta 2T = -0.711$
(12) $\beta 3T/\beta 3W = 1.503$
(13) $f1/fW = 1.567$
(14) $f2/fW = -0.374$
(15) $\beta 3T = -2.571$ As described above, according to the second aspect of the present invention, a high-performance inner-focus type zoom lens, which has a compact structure and a high zoom ratio, and is suitable for a single-lens reflex camera, can be achieved.

Note that by decentering one of the first, second, and third lens groups of the inner-focus type zoom lens according to the second aspect of the present invention in a direction perpendicular to the optical axis, the vibration of the zoom lens as a whole can be canceled, and the image can be stabilized.

What is claimed is:

1. A telephoto zoom lens comprising, in the following order from an object side: a first lens group having a positive refracting power; a second lens group having a negative refracting power; and a third lens group having a positive refracting power, wherein, upon zooming from a wide-angle end to a telephoto end, at least said first and third lens groups move in an object direction, an air distance between said first and second lens groups increases, and an air distance between said second and third lens groups decreases, and said telephoto zoom lens satisfies the following conditions:

$$1.25 \leq f1/fW \leq 1.50$$

$$-0.37 \leq f2/fW \leq -0.30$$

$$0.37 \leq f3/fW \leq 0.46$$

where f1 is the focal length of said first lens group, f2 is the focal length of said second lens group, f3 is the focal length of said third lens group, and fW is the focal length of the entire system at the wide-angle end;

wherein said third lens group comprises, in the following order from the object side, a first lens subgroup having a positive refracting power, and a second lens subgroup having a negative refracting power, and satisfies the following conditions:

$$-5 \leq f3b/f3 \leq -3$$

$$0.3 \leq D/fW \leq 0.6$$

where f3b is the focal length of said second lens subgroup, and D is the air distance between said first and second lens subgroups; and wherein said first lens subgroup comprises, in the following order from the object side, two double-convex positive lens components and a meniscus-shaped lens component having a concave surface facing an image plane side, said second lens subgroup comprises, in the following order from the object side, a negative meniscus lens having a concave surface facing the object side, and a positive lens having a convex surface facing the image plane side, and said second lens subgroup satisfies the following condition:

$$1.2 \leq \beta 3b \leq 1.7$$

where β3b is the imaging magnification of said second lens subgroup at the wide-angle end.

2. A lens according to claim 1, wherein said first lens subgroup comprises, in the following order from the object side, a first double-convex positive lens, a cemented positive lens consisting of a second double-convex positive lens and a negative meniscus lens, and a cemented lens consisting of a third double-convex positive lens and a double-concave negative lens, a stop is arranged immediately behind said first lens subgroup, and said first lens subgroup satisfies the following conditions:

$$n2 - n1 \geq 0.2$$

$$n4 - n3 \geq 0.2$$

where n1: the refractive index of said second double-convex positive lens;

n2: the refractive index of said negative meniscus lens;

n3: the refractive index of said third double-convex positive lens; and n4: the refractive index of said double-concave negative lens.

3. A lens according to claim 1, wherein said first lens subgroup comprises, in the following order from the object side, a first double-convex positive lens, a cemented positive lens consisting of a second double-convex positive lens and a negative meniscus lens, and a cemented lens consisting of a third double-convex positive lens and a double-concave negative lens, a stop is arranged immediately behind said first lens subgroup, and said first lens subgroup satisfies the following conditions:

$$\nu 1 - \nu 2 \geq 10$$

$$v3 - v4 \geq 25$$

where v1: the Abbe's number of said second double-convex positive lens;

v2: the Abbe's number of said negative meniscus lens;

v3: the Abbe's number of said third double-convex positive lens; and v4: the Abbe's number of said double-concave negative lens.

4. An inner-focus type zoom lens comprising, in the following order from an object side: a first lens group having a positive refracting power; a second lens group having a negative refracting power; and a third lens group having a positive refracting power, wherein, upon zooming from a wide-angle end to a telephoto end, at least said first and third lens groups move in an object direction; an air distance between said first and second lens groups increases, and an air distance between said second and third lens groups decreases; upon focusing from a far-distance object to a near-distance object, said second lens group moves in the object direction; and said inner-focus type zoom lens satisfies the following conditions:

$$0.5 \leq |\beta 2T| \leq 0.8, \text{ for } \beta 2T < 0$$

$$1.2 \leq \beta 3T / \beta 3W \leq 2.0$$

where $\beta 2T$ is the imaging magnification of said second lens group at the telephoto end, $\beta 3W$ is the imaging magnification of said third lens group at the wide-angle end, and $\beta 3T$ is the imaging magnification of said third lens group at the telephoto end;

wherein said inner-focus type zoom lens satisfies the following conditions:

$$1.1 \leq f1/fW \leq 1.7$$

$$0.30 \leq |f2|/fW \leq 0.43; \text{ for } f2 < 0$$

where f1 is the focal length of said first lens group, f2 is the focal length of said second lens group, and fW is the focal length of the entire system when said zoom lens is at the wide-angle end.

5. A lens according to claim 4, wherein said inner-focus type zoom lens further satisfies the following conditions:

$$2.0 \leq |\beta 3T| \leq 3.2; \text{ for } \beta 3T < 0.$$

6. A lens according to claim 5 wherein a stop moves together with said third lens group.

\* \* \* \* \*